United States Patent [19]

Hankinson et al.

[11] Patent Number: 4,747,993
[45] Date of Patent: May 31, 1988

[54] PERMANENT SEAL RING FOR A NUCLEAR REACTOR CAVITY

[75] Inventors: Michael F. Hankinson, Monroeville Boro; James R. Marshall, Penn Hills Township, Allegheny County, both of Pa.

[73] Assignee: Westinghouse Electric Corp., Pittsburgh, Pa.

[21] Appl. No.: 9,035

[22] Filed: Jan. 27, 1987

Related U.S. Application Data

[63] Continuation-in-part of Ser. No. 758,907, Jul. 25, 1985, abandoned.

[51] Int. Cl.[4] .............................................. G21C 13/00
[52] U.S. Cl. ..................................... 376/205; 220/378
[58] Field of Search ................. 376/203, 205; 220/378, 220/445

[56] References Cited

U.S. PATENT DOCUMENTS

| | | | |
|---|---|---|---|
| 3,633,784 | 1/1972 | Taft | 376/205 |
| 3,812,008 | 5/1974 | Fryer | 376/205 |
| 4,070,221 | 1/1978 | Anthony | 376/205 |
| 4,170,517 | 10/1979 | Meuschke et al. | 376/205 |
| 4,214,760 | 7/1980 | Godfrey | 376/205 |

Primary Examiner—Deborah L. Kyle
Assistant Examiner—Richard L. Klein
Attorney, Agent, or Firm—D. C. Abeles

[57] ABSTRACT

An annular ring seal for establishing a permanent seal across an annular thermal expansion gap defined between a peripheral wall of a nuclear reactor vessel and a containment wall, which containment wall is spaced apart and surrounds the peripheral wall of the reactor vessel, which collectively define a nuclear reactor containment arrangement. The annular ring seal comprises an annular ring plate having an outer peripheral surface affixed to the containment wall and an inner peripheral surface proximate the reactor vessel; and a flexure member having an annular base plate, which sealingly engages and is affixed to the annular ring plate near the inner peripheral surface thereof, and having a leg which is joined to and extends upwardly from the annular base plate and which is affixed to the peripheral wall of the reaction vessel to thereby seal the annular thermal expansion gap.

24 Claims, 4 Drawing Sheets

PERMANENT SEAL RING FOR A NUCLEAR REACTOR CAVITY

This application is a continuation-in-part application of Ser. No. 758,907, filed July 25, 1985, now abandoned.

BACKGROUND OF THE INVENTION

1. Field of the Invention

This invention relates to nuclear reactor containment arrangements and more particularly to permanent seal rings for establishing a permanent seal across the thermal expansion gap defined between a peripheral wall of a nuclear reactor vessel and a containment wall.

2. Discussion of the Art

The refueling of pressurized water reactors is an established operation which is normally carried out with a high degree of reliability. In such reactors, a reactor vessel is positioned in a cavity formed by a concrete containment wall. The containment wall has a lower annular portion or well in which the vessel is seated and an upper annular portion above the vessel which defines a refueling canal. The canal is maintained dry during reactor operations, but is filled with water during the replacement of spent fuel assemblies. During the refueling, the reactor vessel is opened, thereby exposing the core, and fuel assemblies are exchanged. The water in the refueling canal acts as shielding to maintain radiation levels within acceptable limits.

The reactor vessel has flanges which join a head assembly to the reactor vessel proper. A lower flange is positioned on the peripheral wall of the reactor vessel near the vessel opening and is sealed to the lower portion of the refueling canal by a seal ring. The seal ring prevents leakage, during the refueling operation, of shielding water into the well in which the vessel is seated. The seal ring is usually preferably water-tight, however, pumps are provided in the well for expelling unwanted fluids, such as water which might penetrate the seal if the sealing engagement thereof is imperfect. However, shielding water leakage has more serious consequences than potential damage to the well or vessel. A sudden loss of shielding water from the refueling canal exposes personnel working in the area to high radiation dosages and contaminates the environment. Such a sudden loss of shielding water does not give personnel sufficient time to make safe the exposed radiation sources and must be prevented.

Prior art seal rings are discussed in U.S. Pat. No. 4,170,517 to Meuschke et al, the disclosure of which is herein incorporated by reference. Removable gasket-type seal rings, such as elastomeric gaskets, are known and are installed after reactor cooldown and prior to the flooding of the refueling canal. Such elastomeric gaskets are susceptible to thermal degradation and leakage, require significant amounts of time to install, and must be replaced at each refueling operation.

Permanent seal rings are also known and have the advantage of reducing the time required for the refueling operation. The Meuschke et al patent discloses a permanent, water-tight, flexible seal having a quarter-circular cross-section, made of, for example, stainless steel, and being constructed to cyclicly contract and expand, respectively, with cyclic expansion and contraction of the reactor vessel relative to the containment wall during reactor operation, while maintaining the water-tight integrity of the seal. Such a seal is inherently flexible across its entire expanse, however, and the strength of the member is limited by this flexibility requirement. Thus, such seals are susceptible to damage from falling objects, such as accidentally dropped fuel assemblies. Such accidents can involve a sudden and nearly complete loss of shielding water from the refueling canal, thereby endangering personnel and contaminating the environment.

Accordingly, a new permanent seal ring is needed which is strong and flexible. The new seal ring must be structurally strong enough to withstand the impact of the heaviest object which might inadvertently be dropped thereon, without a complete or sudden loss of shielding water ensuing, and preferably with the sealing integrity being substantially maintained. The new seal ring must also be structurally flexible enough to accommodate the radial and axial thermal expansion/contraction of the reactor vessel relative to the containment wall experienced during reactor operation, while substantially maintaining its sealing integrity, so that the installation may be viably permanent.

SUMMARY OF THE INVENTION

The purpose of the present invention is to provide annular ring seals for establishing a permanent seal across an annular thermal expansion gap defined between a peripheral wall of a nuclear reactor vessel and a containment wall, which containment wall is spaced apart from and surrounds the peripheral wall of the reactor vessel, thus providing a nuclear reactor containment arrangement. The present seals overcome the deficiencies of prior art seals by assuring structural strength sufficient to withstand the impact of the heaviest object which might inadvertently be dropped thereon, without a complete or sudden loss of shielding water, and by assuring structurally flexibility sufficient to accommodate radial and axial thermal expansion/-contraction of the reactor vessel relative to the containment wall experienced during reactor operation while substantially maintaining sealing integrity.

To accomplish this purpose, an annular ring seal is provided, comprising an annular ring plate having an outer peripheral surface which sealingly engages and is affixed to the containment wall and an inner peripheral surface which is proximate the reactor vessel; and a flexure member having an annular base plate, which sealingly engages and is affixed to the annular ring plate near the inner peripheral surface thereof, and having a leg which is joined to and extends upwardly from the annular base plate and which sealingly engages and is affixed to the peripheral wall of the reactor vessel to thereby seal the annular thermal expansion gap.

The accomplishment of this purpose may be redundantly assured by providing the annular ring seal with a backup member including a backup plate which is surrounded by the flexure member and has a first perimeter and a second perimeter, the first perimeter being joined to the inner peripheral surface from which the cylindrical plate extends perpendicularly, and the second perimeter extending toward the peripheral wall of the reactor vessel to thereby provide a backup structure for the flexure member to preclude the possibility of major leakage in the event of a structural failure of the flexure member.

BRIEF DESCRIPTION OF THE DRAWINGS

The invention may be better understood by referring to the detailed description of the invention when taken in conjunction with the accompanying drawing in which.

DETAILED DESCRIPTION OF THE INVENTION

This invention provides new annular ring seals for establishing a permanent seal across the annular thermal expansion gap between the peripheral wall of a nuclear reactor vessel and a containment wall. The new seals may be installed in place of existing prior art seals of either the removable or permanent types. Although their installation may be considered permanent, they can be removed and repaired or replaced if the need arises. The seals according to the present invention are constructed to cyclicly contract and expand, respectively, with cyclic expansion and contraction of the reactor vessel relative to the containment wall during reactor operation, while maintaining the integrity of the seal, most preferably while maintaining the water-tight integrity of the seal. The seals include a flexure member which provides the required flexibility. The seals are structured so that the flexure member is protected from falling objects by virtue of its positioning. Further, the seals include an annular ring plate member which is strong enough to accommodate the force of even the heaviest object which might be accidentally dropped on the plate member during the reactor refueling operation, without complete or sudden loss of shielding water.

Thus, the flexure member of each annular ring seal has an annular base plate which sealingly engages and is affixed to the annular ring plate of the seal near an inner surface thereof proximate the reactor vessel wall, and a leg which extends from the annular base plate, is affixed to the reactor vessel, and sealingly engages the reactor vessel. The flexure member most preferably has an L-shaped cross-section in which case the leg is a cylindrical leg which extends perpendicularly from the annular base plate. The perpendicular, i.e., vertical, extension of such a cylindrical leg from the annular base plate is a structural feature which minimizes the possibility of damage thereto from falling objects by minimizing the exposed horizontal cross-sectional area of the flexure member. However, protection of the flexure member may be accomplished by providing a leg which makes an acute angle with the annular base plate, or, alternately, by a leg which makes an obtuse angle with the annular base plate, so long as the leg is protected from vertically dropped objects by being nested under the reactor vessel flange or an annular ledge. Thus, the flexure member may have a conical cross-section or a cross-section of any other configuration.

This protected flexure member feature significantly contributes to satisfying the need for assurance that a sudden or complete loss of shielding water from the refueling canal will not occur by virtue of a structural failure of the ring seal. The protected flexure member need not be strong enough to directly withstand the impact of a dropped object, but may be manufactured from sheet metal, such as stainless or carbon steel, and must be thin enough to provide the flexibility required to accommodate the cyclic thermal expansion and contraction required of the seal during reactor operations, while having at least the strength to withstand the weight of the shielding water introduced during the reactor refueling operation.

These new ring seals may advantageously be provided with a backup member to provide a back-up structure for the flexure member to preclude the possibility of a major leakage in the event of a structural failure of the flexure member, however improbable. The backup member serves to restrict the flow of water in the event of a structural failure of the flexure member, thereby providing the refueling crew with time to make safe the exposed reactor core or any exposed fuel assemblies, by redundantly assuring the prevention of the catastrophically sudden and/or complete loss of shielding water from the refueling canal.

The backup member includes a backup plate which is positioned inboard of the flexure member, i.e., in closer proximity to the reactor vessel, and which extends from the annular ring plate toward the reactor vessel. The backup plate is most preferably a cylindrical plate extending vertically in cross-section, however, the backup plate may have a conical cross-section of virtually any slope, or a cross-section of any other configuration. The backup plate preferably does not contact the reactor vessel, since the backup member is not intended to sealingly engage the reactor vessel. Sealing engagement of the backup member to the vessel would reduce the flexibility of the structural arrangement needed for thermal expansion/contraction and, in any event, would be difficult to achieve in a permanent ring seal because of the non-accessibility of the juncture of the backup member with the vessel during installation.

The backup member may further include a flashing which biasingly engages the reactor vessel, but which does not sealingly engage the vessel. The term "flashing" as used herein is meant to include a member having any cross-section, such as a conical, hemispherical or spherical cross-section as provided by, for example, a conical ring, a half-moon ring, or an O-ring, respectively.

Figure 1:
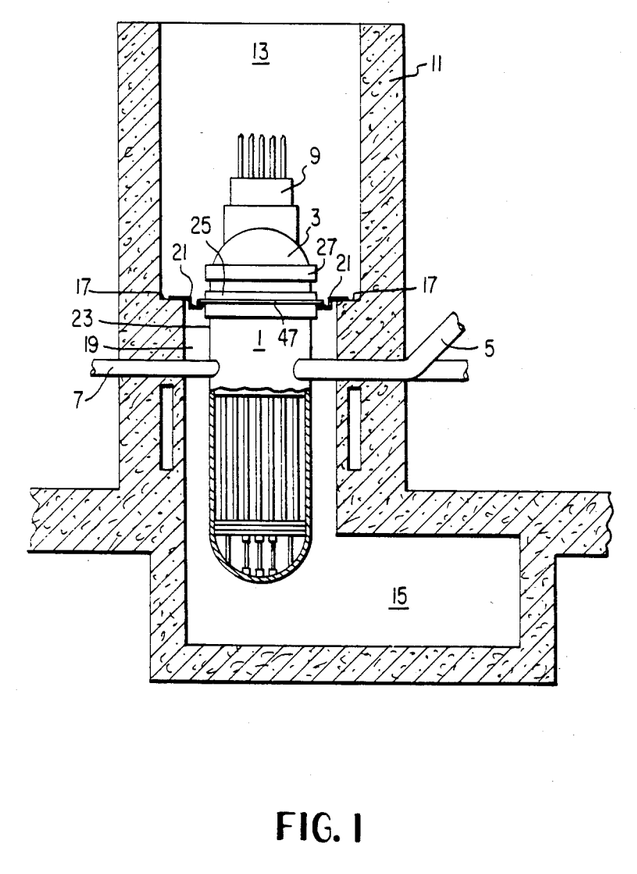
FIG. 1 is an elevational view partly in cross-section of a reactor containment incorporating a preferred annular ring seal according to this invention.

The invention can be better understood by reference to FIG. 1, an elevational view partly in cross-section of a nuclear reactor containment arrangement showing the pertinent part of a nuclear steam generating system of the pressurized water type incorporating a permanent ring seal according to this invention. A nuclear reactor vessel 1 is shown which forms a pressurized container when sealed by its head assembly 3. The reactor vessel 1 has coolant flow inlet means 5 and coolant flow outlet means 7 formed integral with and through its cylindrical wall. The reactor vessel 1 contains a nuclear core (not shown) consisting mainly of a plurality of clad nuclear fuel elements which generate substantial amounts of heat depending primarily upon the position of control means, pressure vessel housing 9 of which is shown. The heat generated by the reactor core is conveyed from the core by coolant flow entering through inlet means 5 and exiting through outlet means 7, as is well established in the art.

The reactor vessel 1 and head assembly 3 are maintained within a reactor cavity defined by a concrete containment wall 11. The reactor cavity is divided into an upper portion which defines and is commonly utilized as a refueling canal 13 and a lower portion which is a well 15 completely surrounding the vessel structure itself. A shelf 17 is provided in the containment wall 11 and divides the upper portion of the reactor cavity from the lower portion.

An open annulus defined between the containment wall 11 and the reactor vessel 1 is an annular thermal expansion gap 19 and is provided with an annular ring seal 21 at least during refueling operations, but preferably is positioned permanently. The ring seal 21 accommodates the normal thermal expansions and contractions of material experienced during reactor operation, while maintaining the integrity of the seal essential during refueling operations in which the upper portion of the reactor cavity defining refueling canal 13 is filled with water in order to provide a radiation shield for the exposed core and refueling assemblies. Preferably, the annular ring seal 21 is a permanent seal which sealingly engages and is affixed to the containment wall 11 (or fixture thereof), preferably along the shelf 17, and to a peripheral wall 23 (or fixture thereof) of the reactor vessel 1, preferably to a lower flange 25 (or fixture thereof) positioned along the peripheral wall 23 near the reactor vessel opening (not shown), the opening being exposed when the head assembly 3, which includes an upper flange 27, is removed during the refueling operation.

Figure 2:
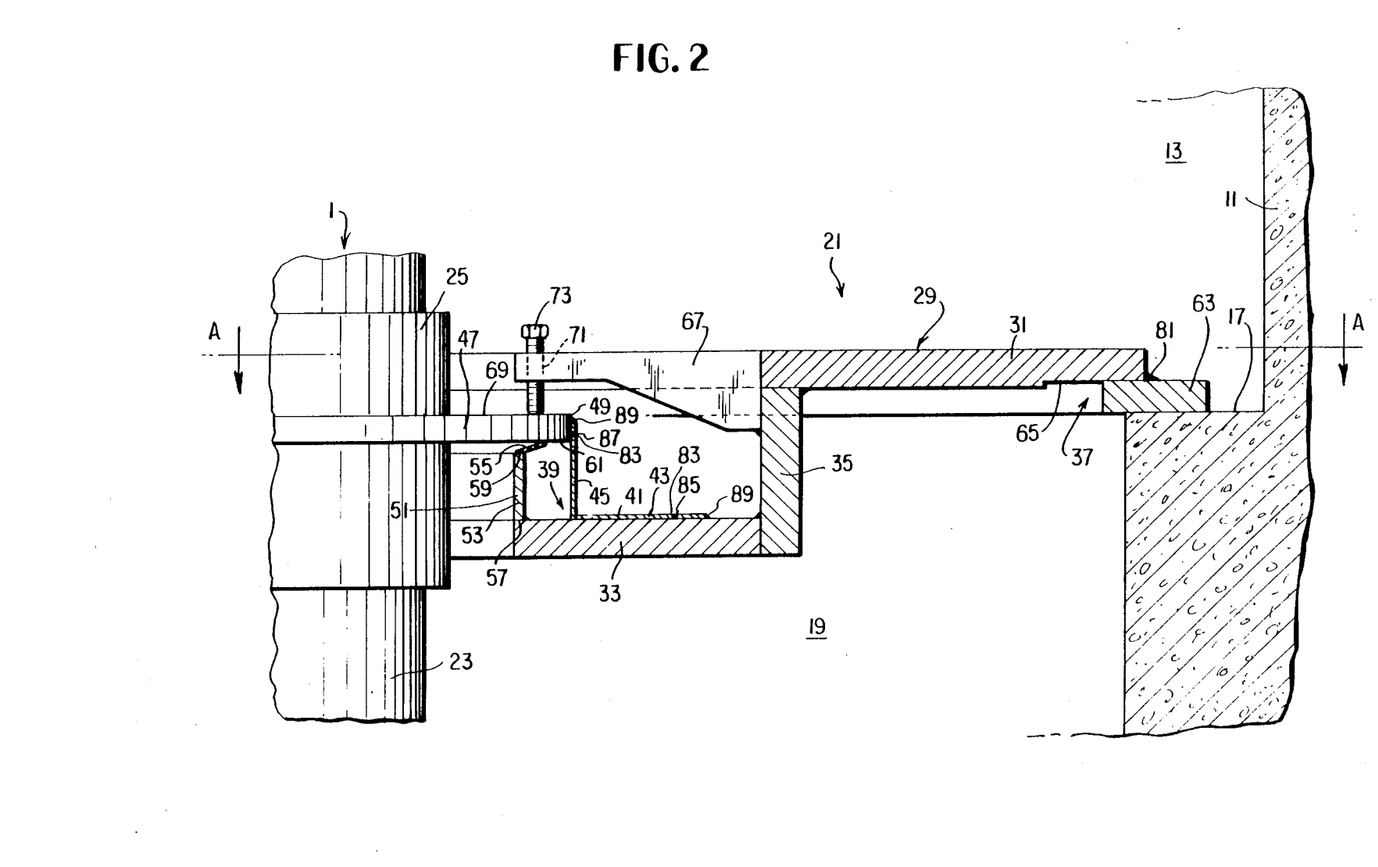
FIG. 2 is an enlarged cross-sectional view of a portion of a preferred annular ring seal according to the invention.

The preferred annular ring seal 21 of this invention can be better appreciated by reference to FIG. 2 which shows, in cross-section, a portion of a ring seal 21 and its interface with the lower flange 25 and the shelf 17 of the containment wall 11. In this preferred embodiment, the annular ring seal 21 comprises an annular ring plate (shown generally at 29). The annular ring plate 29 has a step-shaped cross-section and has a first annular portion 31, a second annular portion 33, and a cylindrical portion 35 which interconnects the first and second annular portions 31, 33, respectively, to form the step-shaped cross-section. The cross-section may alternately have any configuration. The first annular portion 31 surrounds the second annular portion 33 and includes an outer peripheral surface (shown generally at 37) for the annular ring plate 29. The second annular portion 33 includes an inner peripheral surface (shown generally at 39) for the annular ring plate 29.

With continuing reference to FIG. 2, the annular ring seal 21 further comprises a flexure member 41 shown as having an L-shaped cross-section. The flexure member 41 has an annular base plate 43, which sealingly engages and is affixed to the annular ring plate 29 near the inner peripheral surface 39 thereof, the inner peripheral surface 39 of this embodiment being provided in the second annular portion 33. The flexure member 41 also has a leg 45, which is joined to and extends upwardly from the annular base plate 43 and which sealingly engages and is affixed to an annular ledge 47 provided along the lower flange 25 for engaging the ring seal 21. Leg 45 is shown as a cylindrical leg extending perpendicularly upwardly from the annular base plate and forming an L-shaped cross-section therewith. As discussed previously, however, the leg may make an acute angle or an obtuse angle with the annular base plate and still provide a structure in which the flexure member is protected from falling objects by virtue of its positioning. Thus, for example, when the leg and annular bsse plate make an angle other than a right angle with one another, the leg should lie beneath and be protected by, for example, the annular ledge. Further, the extremity of the leg which engages the peripheral wall or a fixture thereof, such as the flange or annular ledge, should be adapted as necessary. The annular ledge 47 has a first surface 49 which overlappingly and sealingly engages the leg 45 of the flexure member 41.

FIG. 2 shows a most preferred embodiment of the present invention in which the annular ring seal 21 also comprises a backup member 51 including backup plate 53 and a flashing 55. The backup plate 53 is shown as a cylindrical plate and is surrounded by the flexure member 41 and has a first perimeter 57 and a second perimeter 59. The first perimeter 57 is joined to the inner peripheral surface 39 from which the backup plate 53 extends upwardly. The flashing 55 extends from the second perimeter 59 and is biased to engage a second surface 61 of the annular ledge 47. In embodiments without a flashing 55, the second perimeter 59 of the backup plate 53 may extend toward the underside second surface 61 of the annular ledge 47, without directly engaging the same, but rather defining an gap therewith sufficient to allow for thermal expansion and contraction.

The backup member 51 provides a backup structure for the flexure member 41 to preclude the possibility of major leakage of shielding water (not shown) in the event of a structural failure of the flexure member 41. The backup member 51 does not form a water-tight seal with the annular ledge 47, but rather functions as a flow restrictor to prevent a catastrophically sudden and/or complete loss of shielding water from the refueling canal 13 during the refueling operation, in the event of a structural failure from, for example, the accidental dropping of a fuel assembly onto the annular ring seal 21. By restricting the flow, the refueling crew is given the necessary time to make safe any exposed radiation sources, thereby further assuring the safety of the crew and preventing contamination of the environment.

FIG. 2 also shows the shelf 17 of the containment wall 11 fitted with a mating plate 63 which has a rectangular cross-section. The mating plate 63 may be, for example, imbedded into or bolted onto the shelf 17 through apertures (not shown) provided in the respective parts and preferably sealingly engages the shelf 17. A lip or recess 65 is shown defined along the outer peripheral surface 37 of the first annular portion 31 of annular ring plate 29. The thickness of the first annular portion 31 in the area of the recess 65 is less than the thickness of the remainder thereof to permit plastic deformation of the first annular portion 31 and to facilitate overlapping and sealing engagement thereof with the mating plate 63. Recess 65 also facilitates initial positioning of the annular ring seal 21 during installation and prevents gross movement thereof in the event of a weld failure.

Annular ring seal 21 may also comprise a plurality of support arms 67, each support arm 67 extending from the cylindrical portion 35 of the annular ring plate 29 toward the reactor vessel 1. Each arm is adapted to rest on the reactor vessel 1, such as on a third surface 69 of the annular ledge 47, thereby providing auxiliary support for the annular ring seal 21. Each support arm 67 is preferably provided with alignment means, shown in FIG. 2 as a threaded aperture 71 defined in each support arm 67 along the portion thereof which overlaps the annular ledge 47 and a leveling bolt 73 threadingly inserted through the threaded aperture 71. Each bolt 73 engages the annular ledge 47 for initially aligning the annular ring seal 21 during installation and for providing auxiliary support for the annular ring seal 21 during the refueling operation. Bolts 73 may optionally be removed during reactor operation. Support arms 67 may be welded onto the annular ring plate 29 and may be conveniently used to support open grating plates (not shown) for personnel to stand on during the refueling operation, which open grating plates rest upon and span the distance between support arms 7. Support arms 67 may be preferably placed at from 20 to 30 degree intervals along the annular ring seal 21.

Figure 3:
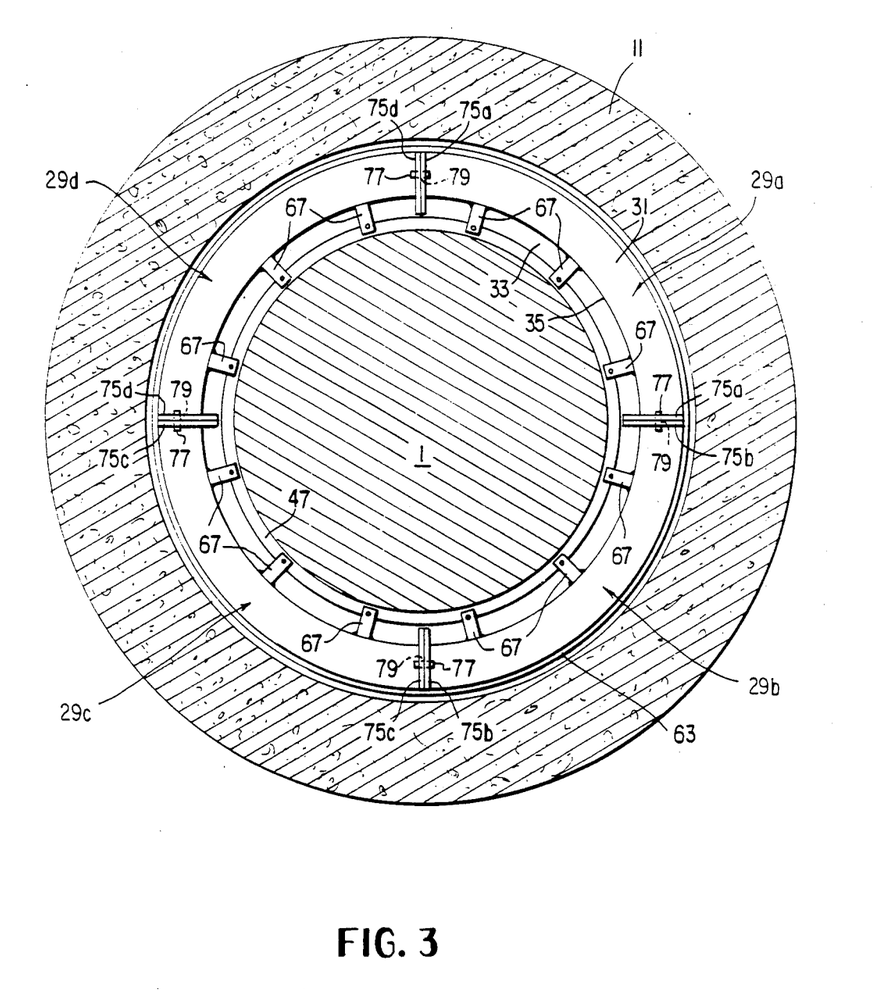
FIG. 3 is a cross-sectional plan view of the reactor containment incorporating the annular ring seal of FIG. 2 as viewed through section line A—A.

FIG. 3 is a cross-sectional plan view of the reactor containment incorporating the annular ring seal 21 of FIG. 2 through section line A—A. Reactor vessel 1 is shown schematically. The annular ring plate 29 of the annular ring seal 21 is more clearly shown as being comprised of a plurality of arc sections 29a, 29b, 29c, 29d. The four arc sections 29a, 29b, 29c, 29d shown have equal arc lengths. Other embodiments are contemplated which have any number of arc sections, such as three arc sections, and the arc lengths thereof need not be equal.

Each arc section may have a pair of flanges 75, shown in FIG. 3 as flange pairs 75a, 75b, 75c, 75d, respectively, for interconnection thereof with adjacent arc sections using flange connection means. Alternate connection means are contemplated however and should be considered to be within the scope of the present invention. The flange connection means shown in FIG. 3 comprises a plurality of dowel pins 77 and a plurality of apertures 79 provided in each flange 75. The apertures 79 of each of a pair of flanges from adjacent arc sections, for example, flanges 75a and 75b from adjacent arc sections 29a and 29b, are aligned respectively and are adapted to receive one dowel pin 77. Adjacent arc sections may further be provided with a sealing weld (not shown).

Figure 4:
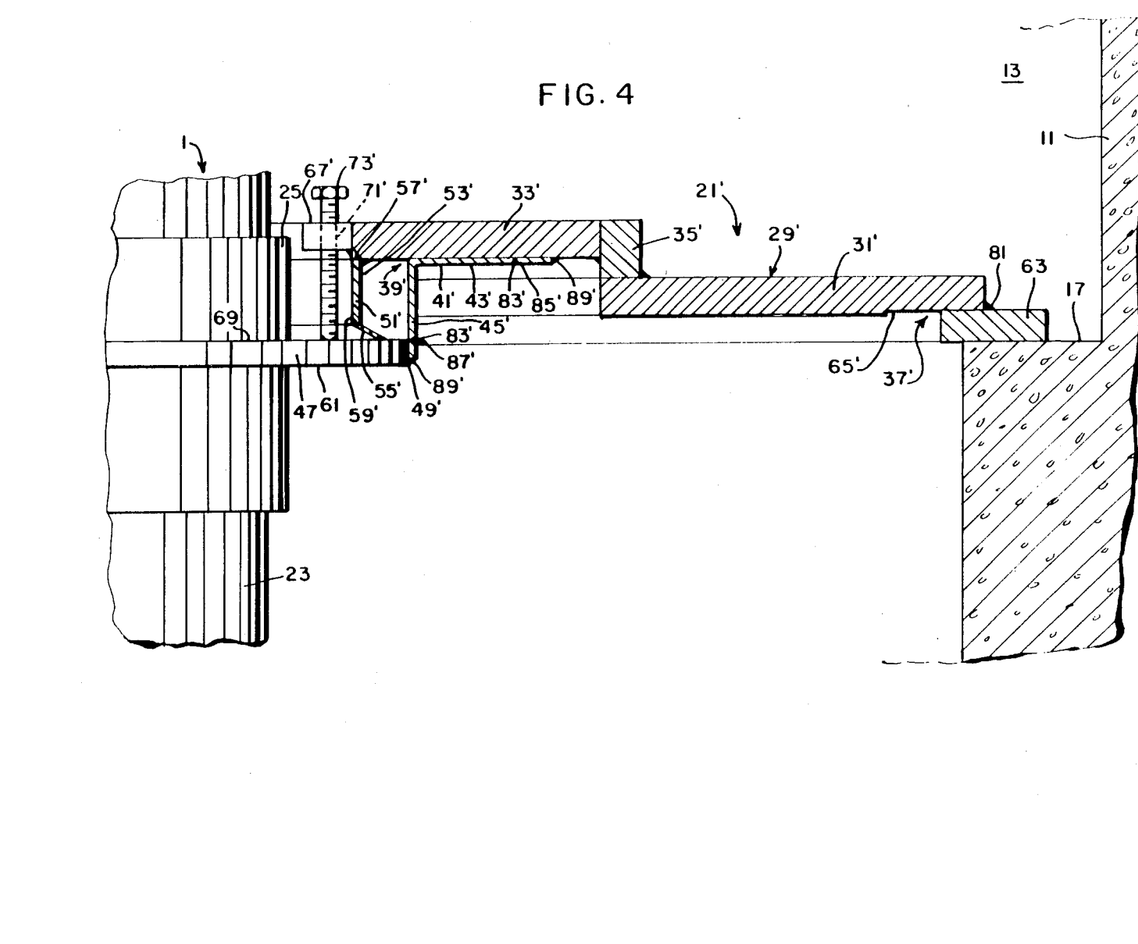
FIG. 4 is an enlarged cross-sectional view of a portion of another preferred annular ring seal according to the invention.

FIG. 4 is an enlarged cross-sectional view of a portion of another preferred annular ring seal according to the invention. Annular base plate 43' is shown offset and positioned above the plane occupied by annular ledge 47 and annular shelf 17. Leg 45' of flexure member 41' extends downwardly from the annular base plate 43'.

By way of example, when the flexure member 41 is designed to withstand up to 12.1 psig of water pressure, and the annular ring plate 29 is designed to withstand the impact of a fuel assembly weighing on the order of 700 kg, the annular ring plate 29 is constructed of 2.54 centimeter thick stainless or carbon steel and the seams joining portions 31, 35 and 33 are welded together. The flexure member 41 is likewise constructed of stainless or carbon steel and has a thickness ranging from 1.6 millimeters to 3.2 millimeters. The backup plate 53 of the backup member 51 is likewise constructed of stainless or carbon steel and has a thickness on the order of 1.27 centimeters. The flashing 55 is biased against the annular ledge 47 and is constructed of stainless steel of approximately 0.3 to 0.4 millimeter. The flashing 55 may alternately be constructed of an elastomer such as rubber and have a thickness of from about 0.8 to 1.6 millimeters.

It is preferable that the various metal portions be all welded together so that the ring seal 21 is gasket free. Further, surface non-uniformities in mating plate 63 are compensated for during installation by using a weld prep 81, shown in FIG. 2, so that the weld prep is compressed on installation by means of a roller or a weld plate. The annular base plate 43 of the flexure member 41 may be affixed to the inner peripheral surface 39 of the second annular portion 33 of the annular ring plate 28 by field welding and, optionally and/or additionally, plug welds 83 may be provided through intermittent apertures 85 provided in annular base plate 43 and spaced apart by from 15 to 30 centimeters. Likewise, the leg 45 of the flexure member 41 may be welded to the first surface 49 of the annular ledge 47 and plug welds 83 may be provided through intermittent apertures 87 provided in the leg 45 and spaced apart by from 15 to 30 centimeters. Fillet welds 89 may also be advantageously used, as shown in FIG. 2, at the ends of annular base plate 43 and leg 45, such weld types being well known in the art.

It will be understood that the above description of the present invention is susceptible to various modifications, changes and adaptations, and the same are intended to be comprehended within the meaning and range of equivalents of the appended claims.

What is claimed is:

1. A nuclear reactor containment arrangement including:
   a. a reactor vessel which thermally expands and contracts during cyclic operation of the reactor and which has a peripheral wall;
   b. a containment wall spaced apart from and surrounding the peripheral wall of the reactor vessel and defining an annular thermal expansion gap therebetween for accommodating thermal expansion; and
   c. an annular ring seal which sealingly engages and is affixed to and extends between the peripheral wall of the reactor vessel and the containment wall, and comprises:
      i. an annular ring plate having an outer peripheral surface which sealingly engages and is affixed to the containment wall, an inner peripheral surface which is positioned proximate the reactor vessel, a step-shaped cross-section, and a first annular portion, a second annular portion, and a cylindrical portion which interconnects the first and second annular portions to form the step-shaped cross-section, the first annular portion surrounding the second annular portion and including the outer peripheral surface which sealingly engages and is affixed to the containment wall, the second annular portion including the inner peripheral surface which is positioned proximate the reactor vessel; and
      ii. a flexure member having an annular base plate affixed to the second annular portion of the annular ring plate near the inner peripheral surface thereof, and having a leg which is joined to and extends upwardly from the annular base plate and sealingly engages and is affixed to the peripheral wall of the reactor vessel to thereby seal the annular thermal expansion gap.

2. The containment arrangement according to claim 1, wherein the containment wall further comprises a shelf, which shelf is provided with a mating plate which sealingly engages and is affixed thereto, the mating plate overlappingly and sealingly engaging and being affixed to the outer peripheral surface of the first annular portion of the annular ring plate.

3. The containment arrangement according to claim 1, further comprising a plurality of support arms, each support arm extending from the cylindrical portion of the annular ring seal toward the reactor vessel and being adapted to rest on the reactor vessel to thereby provide auxiliary support for the annular ring seal.

4. The containment arrangement according to claim 3, wherein the reactor vessel comprises an annular ledge extending outwardly from the reactor vessel toward the containment wall, the annular ledge having a first surface which overlappingly and sealingly engages the leg of the flexure member and wherein each support arm overlappingly engages the annular ledge of the reactor vessel and is provided with alignment means.

5. The containment arrangement according to claim 1, wherein the annular ring plate of the annular ring seal comprises a plurality of arc sections.

6. The containment arrangement according to claim 5, wherein each arc section has a pair of flanges for interconnection thereof with adajacent arc sections, and flange connection means.

7. The containment arrangement according to claim 2, wherein a recess is defined along the outer peripheral surface of the first annular portion of the annular ring plate such that the thickness thereof in the area of the recess is less than the thickness of the remainder thereof to permit plastic deformation of the first annular portion and facilitate overlapping and sealing engagement thereof with the mating plate.

8. A nuclear reactor containment arrangement including:
 a. a reactor vessel which thermally expands and contracts during cyclic operation of the reactor and which has a peripheral wall;
 b. a containment wall spaced apart from and surrounding the peripheral wall of the reactor vessel and defining an annular thermal expansion gap therebetween for accommodating thermal expansion; and
 c. an annular ring seal which sealingly engages and is affixed to and extends between the peripheral wall of the reactor vessel and the containment wall, and comprises:
  i. an annular ring plate having an outer peripheral surface which sealingly engages and is affixed to the containment wall, an inner peripheral surface which is positioned proximate the reactor vessel, a step-shaped cross-section, and a first annular portion, a second annular portion, and a cylindrical portion which interconnects the first and second annular portions to form the step-shaped cross-section, the first annular portion surrounding the second annular portion and including the outer peripheral surface which sealingly engages and is affixed to the containment wall, the second annular portion including the inner peripheral surface which is positioned proximate the reactor vessel;
  ii. a flexure member having an annular base plate affixed to the second annular portion of the annular ring plate near the inner peripheral surface thereof, and having a leg which is joined to and extends upwardly from the annular base plate and sealingly engages and is affixed to the peripheral wall of the reactor vessel to thereby seal the annular thermal expansion gap; and
  iii. a backup member including a backup plate which is surrounded by the flexure member and has a first perimeter and a second perimeter, the first perimeter sealingly engaging and being joined to the inner peripheral surface from which the backup plate extends upwardly, and the second perimeter extending toward the peripheral wall of the reactor vessel to thereby provide a backup structure for the flexure member to preclude the possibility of major leakage in the event of a structural failure of the flexure member.

9. The containment arrangement according to claim 8, wherein the backup member further comprises a flashing which extends from the second perimeter and is biased to engage the peripheral wall of the reactor vessel.

10. The containment arrangement according to claim 8, wherein the reactor vessel further comprises an annular ledge extending outwardly from the peripheral wall thereof, the annular ledge having a first surface which overlapping and sealingly engages the leg of the flexure member.

11. The containment arrangement according to claim 10, wherein the annular ledge has a second surface toward which the second perimeter of the backup member extends.

12. The containment arrangement according to claim 11, wherein the backup member further comprises a flashing which extends from the second perimeter thereof and is biased to engage the second surface of the annular ledge.

13. The containment arrangement according to claim 8, wherein the containment wall further comprises a shelf, which shelf is provided with a mating plate which sealingly engages and is affixed thereto, the mating plate overlappingly and sealingly engaging and being affixed to the outer peripheral surface of the first annular portion of the annular ring plate.

14. The containment arrangement according to claim 13, wherein a recess is defined along the outer peripheral surface of the first annular portion of the annular ring plate such that the thickness thereof in the area of the recess is less than the thickness of the remainder thereof to permit plastic deformation of the first annular portion and facilitate overlapping and sealing engagement thereof with the mating plate.

15. The containment arrangement according to claim 8, further comprising a plurality of support arms, each support arm extending from the cylindrical portion of the annular ring seal toward the reactor vessel and being adapted to rest on the reactor vessel to thereby provide auxiliary support for the annular ring seal.

16. The containment arrangement according to claim 15, wherein the reactor vessel comprises an annular ledge extending outwardly from the reactor vessel toward the containment wall, the annular ledge having a first surface which overlappingly and sealingly engages the leg of the flexure member and wherein each support arm overlappingly engages the annular ledge of the reactor vessel and is provided with alignment means.

17. The containment arrangement according to claim 8, wherein the annular ring plate of the annular ring seal comprises a plurality of arc sections.

18. The containment arrangement according to claim 17, wherein each arc section has a pair of flanges for interconnection thereof with adjacent arc sections, and flange connection means.

19. The containment arrangement according to claim 1, wherein the flexure member, in a longitudinal plane containing the longitudinal axis, has an L-shaped cross-section and the leg thereof is linear in cross-section.

20. The containment arrangement according to claim 1, wherein the reactor vessel comprises an annular ledge extending outwardly from the reactor vessel toward the containment wall and wherein the flexure member is nested under the annular ledge whereby the flexure member is substantially protected from vertically dropped objects.

21. A nuclear reactor containment arrangement including:
   a. a reactor vessel which thermally expands and contracts during cyclic operation of the reactor and which has a peripheral wall;
   b. a containment wall spaced apart from and surrounding the peripheral wall of the reactor vessel and defining an annular thermal expansion gap therebetween for accommodating thermal expansion; and
   c. an annular ring seal which sealingly engages and is affixed to and extends between the peripheral wall of the reactor vessel and the containment wall, and comprises:
      i. an annular ring plate having an outer peripheral surface which sealingly engages and is affixed to the containment wall, an inner peripheral surface which is positioned proximate the reactor vessel, a step-shaped cross-section, and a first annular portion, a second annular portion, and a cylindrical portion which interconnects the first and second annular portions to form the step-shaped cross-section, the first annular portion surrounding the second annular portion and including the outer peripheral surface which sealingly engages and is affixed to the containment wall, the second annular portion including the inner peripheral surface which is positioned proximate the reactor vessel; and
      ii. a flexure member having an annular base plate affixed to the annular ring plate near the inner peripheral surface thereof, and having a leg which is joined to and extends from the annular base plate and sealingly engages and is affixed to the peripheral wall of the reactor vessel to thereby seal the annular thermal expansion gap.

22. The containment arrangement according to claim 21, wherein the leg of the flexure member extends downwardly from the annular base plate.

23. The containment arrangement according to claim 21, wherein the reactor vessel has a flange provided on the peripheral wall thereof and an annular ledge provided on the flange, wherein the containment wall has an annular shelf which lies substantially in the same plane as the annular ledge of the reactor vessel, wherein the annular base plate is offset from the plane occupied by the annular ledge and the annular shelf, and wherein the leg of the flexure member sealingly engages and is affixed to the annular ledge of the reactor vessel.

24. The containment arrangement according to claim 23, wherein the annular base plate is offset and positioned above the plane occupied by the annular ledge and the annular shelf, and wherein the leg of the flexure member extends downwardly from the annular base plate.

* * * * *